US012647451B2

(12) United States Patent
Wescoe

(10) Patent No.: US 12,647,451 B2
(45) Date of Patent: *Jun. 2, 2026

(54) MODELING SIMULATED CYBERSECURITY ATTACK DIFFICULTY

(71) Applicant: Proofpoint, Inc., Sunnyvale, CA (US)

(72) Inventor: Kurt Frederick Wescoe, Pittsburgh, PA (US)

(73) Assignee: Proofpoint, Inc., Sunnyvale, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 18/922,886

(22) Filed: Oct. 22, 2024

(65) Prior Publication Data

US 2025/0047705 A1 Feb. 6, 2025

Related U.S. Application Data

(63) Continuation of application No. 17/346,969, filed on Jun. 14, 2021, now Pat. No. 12,160,441.

(Continued)

(51) Int. Cl.
| | |
|---|---|
| *H04L 29/06* | (2006.01) |
| *G06N 20/00* | (2019.01) |
| *H04L 9/40* | (2022.01) |

(52) U.S. Cl.
CPC ......... *H04L 63/1433* (2013.01); *G06N 20/00* (2019.01); *H04L 63/20* (2013.01)

(58) Field of Classification Search
None
See application file for complete search history.

(56) References Cited

U.S. PATENT DOCUMENTS

| | | | | |
|---|---|---|---|---|
| 10,313,387 B1 * | 6/2019 | Kras | ................... | H04L 63/1433 |
| 10,581,868 B2 * | 3/2020 | Kras | .................... | H04L 63/104 |

(Continued)

FOREIGN PATENT DOCUMENTS

WO 2019108620 A1 6/2019

OTHER PUBLICATIONS

Zhu, Yongli; Liu, Chengxi. Mitigating Multi-Stage Cascading Failure by Reinforcement Learning. 2019 IEEE Innovative Smart Grid Technologies—Asia (ISGT Asia). https://ieeexplore.ieee.org/stamp/stamp.jsp?tp=&arnumber=8881486 (Year: 2019).*

(Continued)

*Primary Examiner* — Jeremiah L Avery
(74) *Attorney, Agent, or Firm* — Banner & Witcoff, Ltd.

(57) ABSTRACT

Aspects of the disclosure relate to providing training and information based on simulated cybersecurity attack difficulty. A computing platform may retrieve data associated with a plurality of attack templates for simulating cybersecurity attacks. Subsequently, the computing platform may use one or more models to compute a predicted failure rate for each template of the plurality of attack templates in order to yield a plurality of predicted failure rates for an organization. Based on the plurality of predicted failure rates, the computing platform may use one or more of the plurality of attack templates to configure a simulated cybersecurity attack on the organization. Then, the computing platform may send, via the communication interface, to an administrator user device associated with the organization, information about the simulated cybersecurity attack and may execute the simulated cybersecurity attack.

20 Claims, 10 Drawing Sheets

Related U.S. Application Data

(60) Provisional application No. 63/047,583, filed on Jul. 2, 2020.

(56) References Cited

U.S. PATENT DOCUMENTS

| | | | | |
|---|---|---|---|---|
| 10,880,325 | B2 * | 12/2020 | Sjouwerman | G06N 5/02 |
| 11,316,891 | B2 * | 4/2022 | Sbandi | H04L 63/1441 |
| 11,620,379 | B1 * | 4/2023 | Hegde | G06F 21/554 |
| | | | | 706/23 |
| 12,039,559 | B2 | 7/2024 | Cella et al. | |
| 2016/0301705 | A1 * | 10/2016 | Higbee | H04L 51/42 |
| 2018/0324201 | A1 * | 11/2018 | Lowry | H04L 63/1441 |
| 2019/0034623 | A1 * | 1/2019 | Lowry | G06F 21/54 |
| 2019/0173916 | A1 | 6/2019 | Irimie et al. | |
| 2019/0173919 | A1 * | 6/2019 | Irimie | G06N 3/09 |
| 2019/0356679 | A1 * | 11/2019 | Sites | H04L 63/1416 |
| 2020/0250303 | A1 * | 8/2020 | Lowry | G06F 11/3409 |
| 2020/0265358 | A1 * | 8/2020 | Irimie | H04L 51/212 |
| 2021/0021636 | A1 * | 1/2021 | Sbandi | G06N 3/09 |

OTHER PUBLICATIONS

Kumar, Akshay et al. Novel anomaly detection and classification schemes for Machine-to-Machine uplink. 2018 IEEE International Conference on Big Data (Big Data). https://ieeexplore.ieee.org/stamp/stamp.jsp?tp=&arnumber=8622142 (Year: 2018).*

Sep. 1, 2025—(EP) Office Action—App 21181273.0.

Nov. 25, 2021—(EP) EESR App No. 21181273.0.

Musumeci, Francesco et al. "A Tutorial on Machine Learning for Failure Management in Optical Networks", Journal of Lightwave Technology, vol. 37, Issue: 16. <https://ieeexplore.ieee.org/stamp/stamp.jsp?tp=&arnumber=8735762> (Year: 2019).

Zhao, Zilong et al., "Robust Anomaly Detection on Unreliable Data", 2019 49th Annual IEEE/IFIP International Conference on Dependable Systems and Networks (DSN). <https://ieeepslore.ieee.org/stamp/stamp.jsp?tp=&arnumber=8809512> (Year:2019).

* cited by examiner

100

110

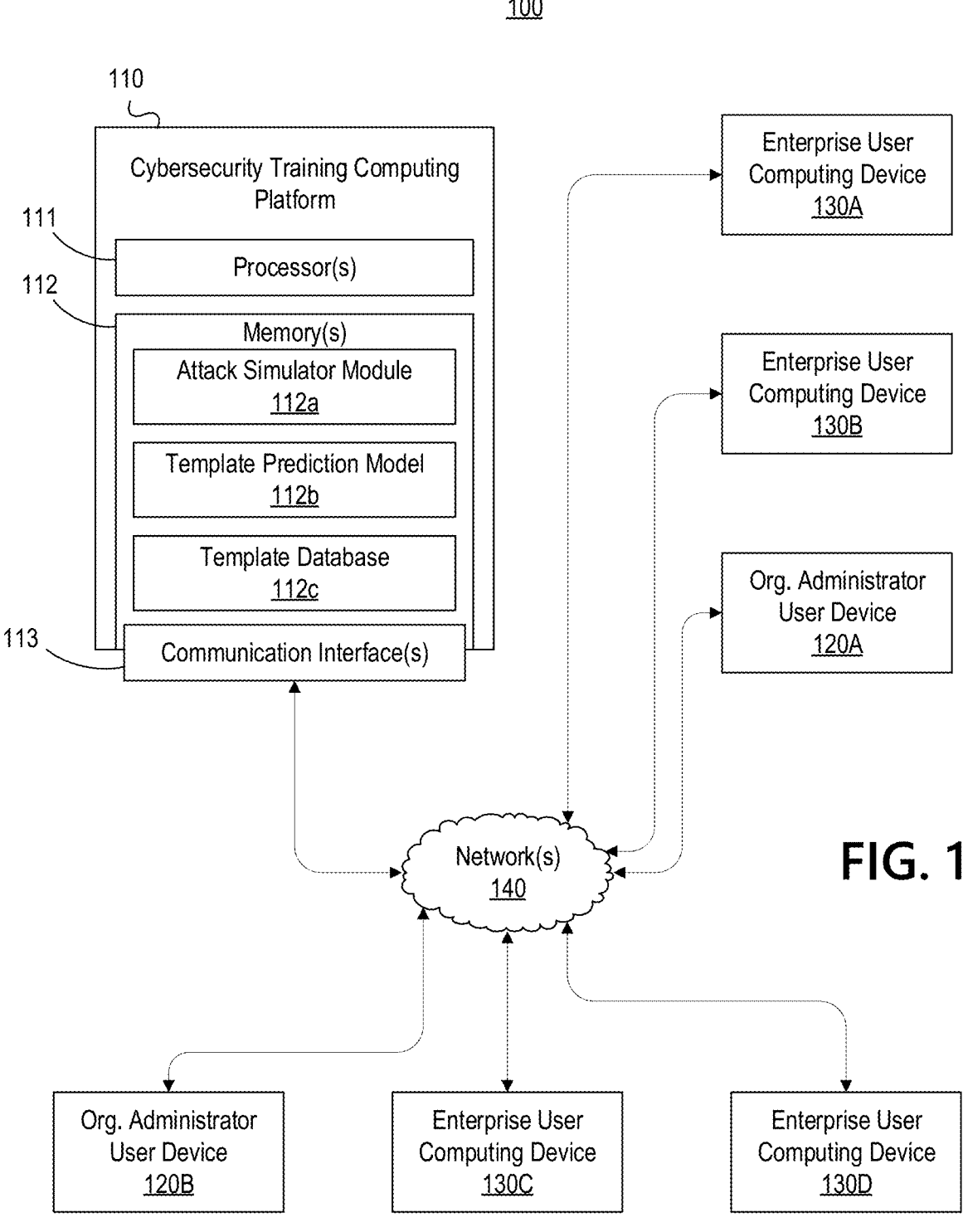

Cybersecurity Training Computing Platform

111

Processor(s)

112

Memory(s)

Attack Simulator Module
112a

Template Prediction Model
112b

Template Database
112c

113

Communication Interface(s)

Enterprise User Computing Device
130A

Enterprise User Computing Device
130B

Org. Administrator User Device
120A

Network(s)
140

Org. Administrator User Device
120B

Enterprise User Computing Device
130C

Enterprise User Computing Device
130D

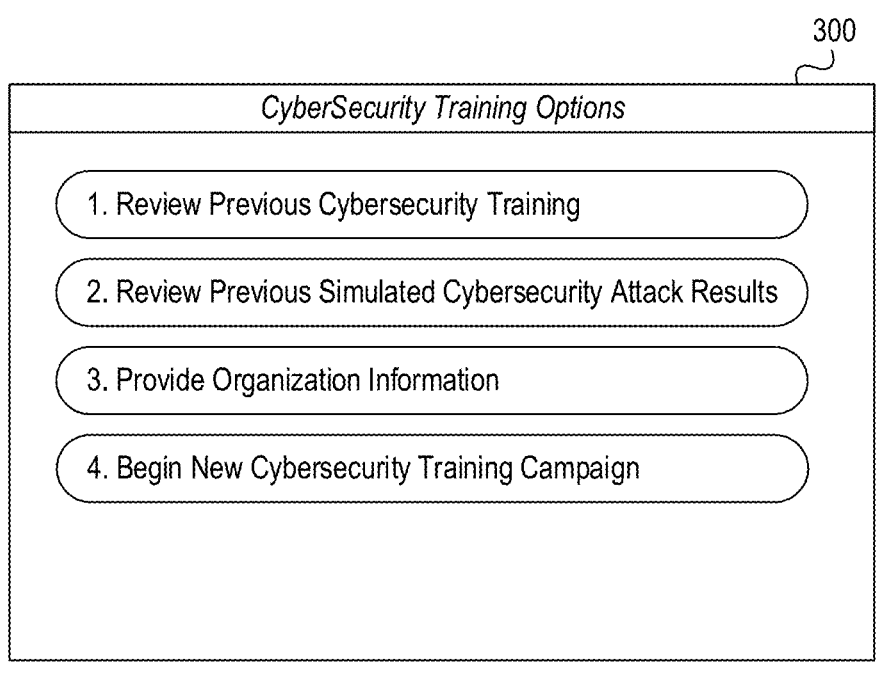

CyberSecurity Training Options

1. Review Previous Cybersecurity Training

2. Review Previous Simulated Cybersecurity Attack Results

3. Provide Organization Information

4. Begin New Cybersecurity Training Campaign

Organization-Level Predicted Failure Data

The organization's primary risk comes from attacks similar to X and Y templates:

X template Predicted Failure Rate: 5.1%
Y template Predicted Failure Rate: 2.4%

1. Add X template to Simulated Cybersecurity Attack

2. Queue Y template for Followup Training

Benchmark Data – X template (5.1%)
All organizations: 3% Failure Rate
Same-Industry: 4% Failure Rate
Similar-Size: 3.5% Failure Rate

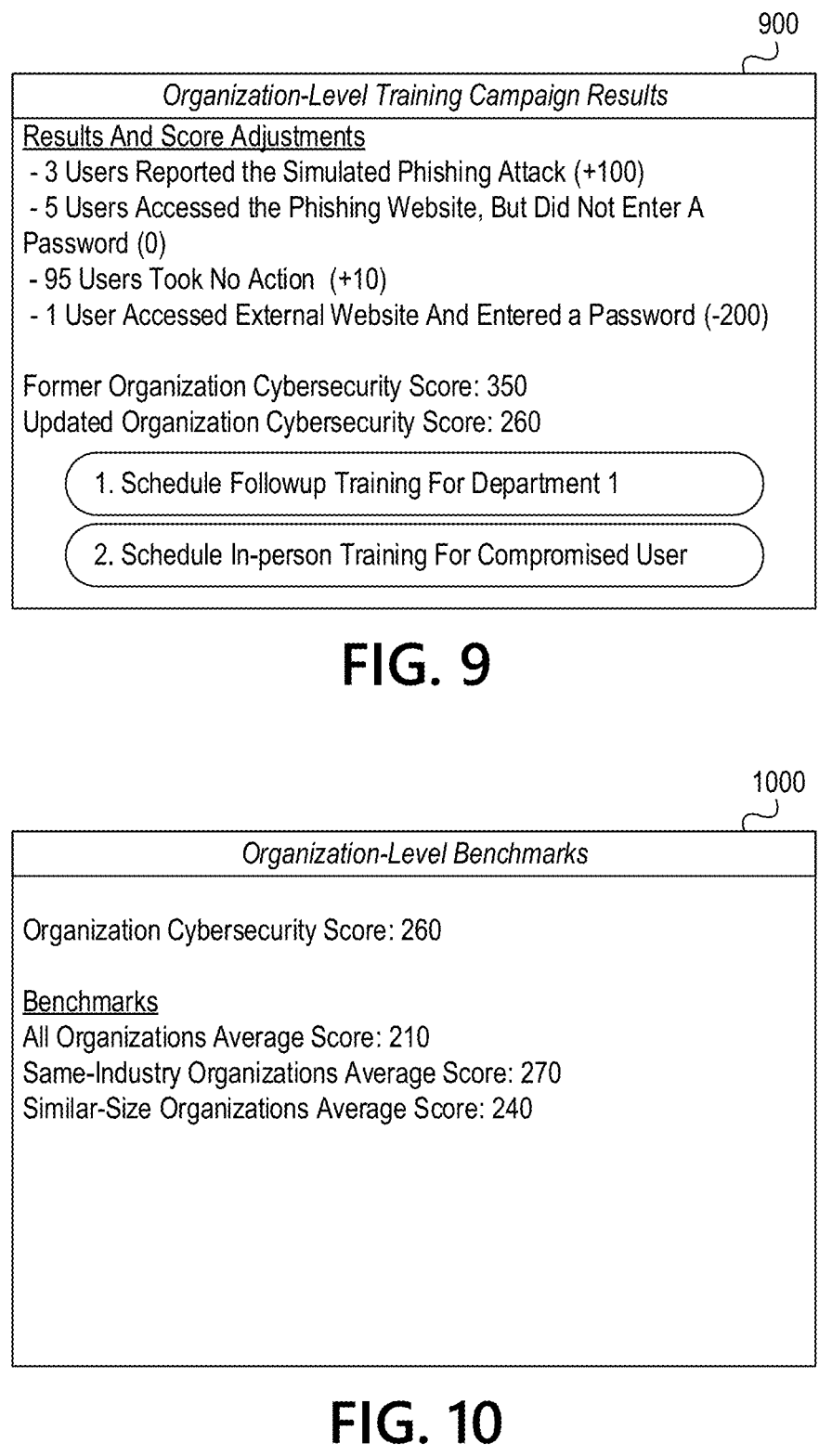

```
┌─────────────────────────────────────────────────────────┐
│          Organization-Level Training Campaign Results     │
├─────────────────────────────────────────────────────────┤
│ Results And Score Adjustments                            │
│  - 3 Users Reported the Simulated Phishing Attack (+100) │
│  - 5 Users Accessed the Phishing Website, But Did Not Enter A │
│ Password (0)                                             │
│  - 95 Users Took No Action  (+10)                        │
│  - 1 User Accessed External Website And Entered a Password (-200) │
│                                                          │
│ Former Organization Cybersecurity Score: 350            │
│ Updated Organization Cybersecurity Score: 260           │
│                                                          │
│      ╭──────────────────────────────────────────╮        │
│      │ 1. Schedule Followup Training For Department 1 │    │
│      ╰──────────────────────────────────────────╯        │
│      ╭──────────────────────────────────────────╮        │
│      │ 2. Schedule In-person Training For Compromised User │ │
│      ╰──────────────────────────────────────────╯        │
└─────────────────────────────────────────────────────────┘
```

```
┌─────────────────────────────────────────────────────────┐
│              Organization-Level Benchmarks               │
├─────────────────────────────────────────────────────────┤
│                                                          │
│ Organization Cybersecurity Score: 260                   │
│                                                          │
│ Benchmarks                                               │
│ All Organizations Average Score: 210                     │
│ Same-Industry Organizations Average Score: 270           │
│ Similar-Size Organizations Average Score: 240            │
│                                                          │
│                                                          │
│                                                          │
│                                                          │
│                                                          │
│                                                          │
└─────────────────────────────────────────────────────────┘
```

FIG. 10

MODELING SIMULATED CYBERSECURITY ATTACK DIFFICULTY

CROSS-REFERENCE TO RELATED APPLICATIONS

This application is a continuation of and claims priority to co-pending U.S. patent application Ser. No. 17/346,969, filed Jun. 14, 2021, and entitled, "Modeling Simulated Cybersecurity Attack Difficulty," which claims the benefit of and priority to U.S. Provisional Patent Application Ser. No. 63/047,583, filed Jul. 2, 2020, and entitled "Using Statistical Analysis And Machine Learning Algorithms To Determine Simulated Attack Template Difficulty," all of which are incorporated by reference herein in their entirety.

TECHNICAL FIELD

Aspects of the disclosure relate to cybersecurity. In particular, one or more aspects of the disclosure relate to providing information about potential cybersecurity threats, as well as performing cybersecurity training in order to reduce the likelihood of members of an organization being compromised by genuine cybersecurity attacks.

BACKGROUND

Increasingly, organizations and individuals face various cybersecurity threats through electronic communications. While various solutions have been developed in an attempt to train users to recognize and avoid cybersecurity threats, the attacks may still be effective in some instances. Cyber attackers are continually developing new tactics and methods to deceive users into providing sensitive information while avoiding automated solutions for combatting cybersecurity threats. Thus, there is a continuing and ever-present need to keep up with the cyber attackers by training users regarding new or otherwise high-risk threats without overburdening them with out of date or less relevant information about lower-risk threats.

SUMMARY

Aspects of the disclosure provide technical solutions that overcome one or more of the technical problems described above and/or other technical challenges. For instance, one or more aspects of the disclosure relate to providing a flexible and automated system for determining which types of cybersecurity attacks pose the greatest risk to an organization, and then quickly and automatically creating training and testing materials on the greatest risk threats. Further aspects provide organizations with benchmark information so they may compare their predicted and actual performance in training with the performance of other organizations. Further aspects provide organizations with automated training, including simulations of attacks based on the highest risk threats, and may score the performance of the organization based on the difficulty of the simulated attacks.

In accordance with one or more embodiments, a computing platform having at least one processor, a communication interface, and memory may retrieve data associated with a plurality of attack templates for simulating cybersecurity attacks; use one or more models to compute, based on one or more organization-specific attributes, a predicted failure rate for each template of the plurality of attack templates in order to yield a plurality of predicted failure rates for an organization; based on the plurality of predicted failure rates, use one or more of the plurality of attack templates to configure a simulated cybersecurity attack on the organization; send, via the communication interface, to an administrator user device associated with the organization, information about the simulated cybersecurity attack; and execute the simulated cybersecurity attack by contacting members of the organization using a communication specified in a first attack template.

In one or more embodiments, the computing platform may execute the simulated cybersecurity attack by sending simulated phishing messages to members of the organization.

In one or more embodiments, the computing platform may generate a machine learning model to compute the predicted failure rate based on a training data set that correlates organization-specific attributes to historical cybersecurity attack outcome data indicating whether historical cybersecurity attacks were successes or failures. Additionally or alternatively, the computing platform may generate a linear regression model to compute a predicted failure rate for a template based on the organization-specific attributes.

In one or more embodiments, the computing platform may, prior to executing the simulated cybersecurity attack using the first attack template: customize a training module based on information associated with the first attack template; and provide the customized training module to the organization.

In one or more embodiments, the organization-specific attributes may comprise one or more of a size of the organization, an industry in which the organization operates, a cybersecurity score of the organization, or member data indicating attributes of members of the organization. The member data may indicate one or more of a role of each member of the organization, whether each member of the organization has access to sensitive data, a cybersecurity score of each member of the organization, or whether each member of the organization previously failed a cybersecurity attack. The computing platform may update a cybersecurity score for each member of the organization based on a response to a simulated cybersecurity attack. The updating may comprise increasing the cybersecurity score in proportion to a difficulty factor associated with the first attack template. Additionally or alternatively, the updating may comprise increasing the cybersecurity score based on the member reporting the simulated cybersecurity attack.

In one or more embodiments, the computing platform may further generate a cybersecurity score for the organization; generate one or more cybersecurity scores for one or more departments of the organization; and generate one or more cybersecurity scores for one or more members of the organization.

In one or more embodiments, the predicted failure rate may comprise one or more of an organization-wide predicted failure rate, a department-specific predicted failure rate, or a member-specific predicted failure rate.

In one or more embodiments, the computing platform may further execute a second simulated cybersecurity attack against a particular department of the organization by contacting members of the department using a communication specified in a second attack template. Additionally or alternatively, the computing platform may execute a third simulated cybersecurity attack against a particular member of the organization by contacting the member using a communication specified in a third attack template.

In one or more embodiments, the computing platform may, based on the results of the simulated cybersecurity attack, schedule follow-up training for one or more members of the organization, customize the follow-up training based on a type of the first attack template; and provide the customized follow-up training to the group of members.

In one or more embodiments, the computing platform may generate a comparison of a simulated attack performance of the organization to the performances of other organizations in the same industry as the organization; and send the comparison to the administrator user device associated with the organization.

BRIEF DESCRIPTION OF THE DRAWINGS

The present disclosure is illustrated by way of example and not limited in the accompanying figures in which like reference numerals indicate similar elements and in which:

FIG. 1 depicts an illustrative operating environment for providing training and information based on simulated cybersecurity attack difficulty in accordance with one or more example embodiments;

FIGS. 3-10 depict illustrative user interfaces for providing training and information based on simulated cybersecurity attack difficulty in accordance with one or more example embodiments.

DETAILED DESCRIPTION

Figure 2A:
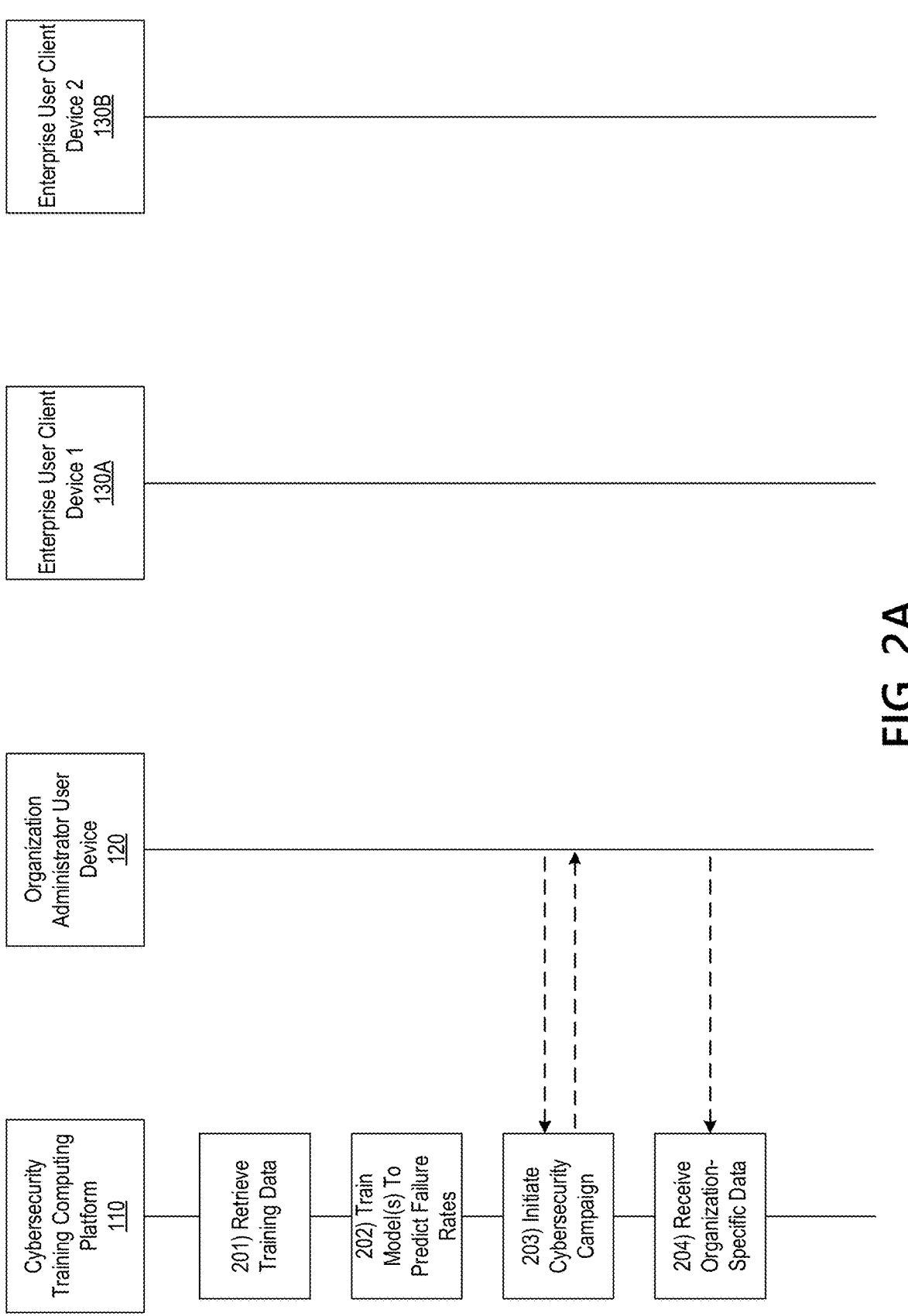
FIGS. 2A-2D depict an illustrative event sequence for providing training and information based on simulated cybersecurity attack difficulty in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to improving cybersecurity in electronic communications. More specifically, and as discussed in further detail below, simulated attack templates that describe a certain type of cybersecurity attack may be provided in a computing system. The attack templates may correspond to real-word cyberattacks, and may be developed based on observing new techniques developed by cyber attackers for performing attacks. These attack templates may be analyzed and used for information and training purposes, and provide an easy and flexible method of quickly adapting cybersecurity information and training to new types of cybersecurity attacks when they are discovered and deployed by cyber attackers.

One or more aspects of the disclosure thus provide technical solutions to various technical problems associated with enterprise security in the context of electronic communications. For example, models may be developed based on training data derived from observations of real cyberattacks, as well as training data derived from simulated attacks used for training purposes. The training data may further include information about specific organizations against which the attacks were deployed. Therefore, the models may be used to predict which types of attacks are most likely to be successful against a particular organization based on specific data about that organization. This information may be provided to cybersecurity managers at the organization in order to allow the cybersecurity managers to harden security and train users against the riskiest attack vectors. The training may be tailored based on the most likely types of attacks, and may include simulated cybersecurity attacks that use the various attack templates to provide realistic and effective simulated cybersecurity attacks for training purposes. Outcome data may be generated based on the training in order to reveal cybersecurity weaknesses and provide for tailored follow-up training using an iterative process.

Furthermore, by collecting specific information about certain groups and even individuals within organizations, the solutions described below may allow for the analysis and prediction of which types of attacks are most likely to be effective against different parts of the organization. Based on this information, training plans and simulated attacks may be tailored for specific groups and even individuals within an organization in order to maximize the utility and flexibility of a training campaign. Again, outcome data for the group- and member-specific training may be generated in order to reveal specific cybersecurity weaknesses and allow training resources to be deployed efficiently.

In addition, both prediction data and outcome data may be compared against benchmarks developed using data about other organizations. This data may enable cybersecurity managers to understand how their organizations compare to other similarly-situated organizations, and could potentially lead to collaborative inter-organizational approaches to combatting cybersecurity attacks.

FIG. 1 depicts an illustrative operating environment for providing training and information based on simulated cybersecurity attack difficulty in accordance with one or more example embodiments. Referring to FIG. 1, computing environment 100 may include various computer systems, computing devices, networks, and/or other operating infrastructure. For example, computing environment 100 may include a cybersecurity training computing platform 110, a plurality of organization administrator user devices (e.g., 120A, 120B), a plurality of enterprise user computing devices (e.g., 130A-D), and one or more network(s) 140.

Network(s) 140 may include one or more wired networks and/or one or more wireless networks that interconnect the cybersecurity training computing platform 110, plurality of organization administrator user devices (e.g., 120A, 120B), plurality of enterprise user computing devices (e.g., 130A-D), and/or other computer systems and/or devices. In addition, each of the cybersecurity training computing platform 110, plurality of organization administrator user devices (e.g., 120A, 120B), and/or plurality of enterprise user computing devices (e.g., 130A-D) may be special purpose computing devices configured to perform specific functions, as illustrated in greater detail below, and may include specific computing components such as processors, memories, communication interfaces, and/or the like.

The cybersecurity training computing platform 110 may include one or more processor(s) 111, one or more memory(s) 112, and one or more communication interface(s) 113. In some instances, cybersecurity training computing platform 110 may be made up of a plurality of different computing devices, which may be distributed within a single data center or a plurality of different data centers. In these instances, the one or more processor(s) 111, one or more memory(s) 112, and one or more communication interface(s) 113 included in cybersecurity training computing platform 110 may be part of and/or otherwise associated with the different computing devices that form cybersecurity training computing platform 110.

In one or more arrangements, processor(s) 111 may control operations of cybersecurity training computing platform 110. Memory(s) 112 may store instructions that, when executed by processor(s) 111, cause cybersecurity training computing platform 110 to perform one or more functions, as discussed below. Communication interface(s) 113 may include one or more wired and/or wireless network interfaces, and communication interface(s) 113 may connect cybersecurity training computing platform 110 to one or more networks (e.g., network(s) 140) and/or enable cybersecurity training computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause cybersecurity training computing platform 110 to perform various functions) and/or databases (which may, e.g., store data used by cybersecurity training computing platform 110 in performing various functions). For example, memory(s) 112 may store and/or otherwise provide an attack simulator 112a, a failure rate prediction model 112b, and database 112c. In some instances, the training and simulation module 112a may store instructions that cause cybersecurity training computing platform 110 to implement training and information provision based on simulated cybersecurity attack difficulty as discussed herein. Additionally, the failure prediction model 112b may store one or more models that cause cybersecurity training computing platform 110 to predict failure rates for one or more attack templates based on various organizational factors and/or one or more other functions described herein. Furthermore, the database 112c may store data that may be used by cybersecurity training computing platform 110 in for training the models, for simulating attacks, for providing training materials to users, and/or in executing one or more other functions described herein.

The plurality of organization administrator user devices 120 may be associated with respective organizations. For example, organization administrator user device 120A may be associated with a first organization, and organization administrator user device 120B may be associated with a second organization. The organizations may be enterprise organizations or any other type of organization. Each organization administrator user device 120 may be used by a member of the organization (e.g., an IT support member) to provide and/or manage cybersecurity and cybersecurity training for the organization. Any number of organizations may communicate with the cybersecurity training computing platform 110 using an organization administrator user device 120 to manage cybersecurity for the organization as described below.

The enterprise user computing device(s) 130 may be used by respective enterprise users (e.g., employees of an enterprise organization). For example, enterprise user computing device(s) 130A and 130B may be associated with different enterprise users of a first organization, and enterprise user computing device(s) 130C and 130D may be associated with different enterprise users of a second organization. The enterprise user computing device 130 may be user-owned devices, employer-provided devices, or other types of devices used by respective enterprise users. The users of the enterprise user computing devices 130 may participate in cybersecurity training, including simulated cybersecurity attacks, as described below.

In many instances, organizations may have different numbers of enterprise users, different structures, and different users in charge of managing cybersecurity. Thus, although the examples below describe cybersecurity training in the context of a few example devices, it should be understood that these descriptions are intended to show example operations that may be used in real-world contexts involving potentially large numbers of users, cybersecurity services that may customized for various organizations, and other variations.

FIGS. 2A-2D depict an illustrative event sequence for providing training and information based on simulated cybersecurity attack difficulty. Referring to FIG. 2A, at step 201 the cybersecurity training computing platform 110 may retrieve training data associated with cybersecurity attacks from the database 112c (e.g., for the purpose of creating or training a model to predict failure rates). The training data may include one or more simulated attack templates, as well as information for training a model to predict failure rates for organization, groups, and/or individuals. For example, the training data may include historical cybersecurity attack data indicating a particular cybersecurity type of attack (e.g., an attack template), various data about the targets of the cybersecurity attack, and whether the cybersecurity attack succeeded or failed.

The various attack templates may indicate various methods of performing a cybersecurity attack. For example, one template may specify a particular phishing email directing a user to access a malicious website and enter the user's password. A second template may specify a similar phishing email that uses different wording to direct a user to a malicious website and enter the user's password. Another template may specify a different type of phishing email requesting the user to reply with a sensitive data file. Another template may specify an email with a trojan program or some other malicious software attached to it. Another template may specify a phone call to a user to verbally request sensitive data. Although many of the examples below discuss email phishing attacks, in general it should be understood that attack templates, as discussed herein, may specify any type of cyberattack.

The historical cybersecurity attack data may specify various input data for creating and/or training a model based on historical cybersecurity attacks on various organizations. The input data may include data specifying the organization that was attacked, particular groups within organizations that were attacked, individual members of organizations that were attacked, the type of attack (e.g., phishing, trojan, etc.), and one or more particular attack templates that were used in the attack. The historical cybersecurity attack data may further include target data for training a model that indicates whether (and/or to what extent) the particular attack was successful or not. The target data may indicate whether an attack was successful using a binary value (e.g., successful or not successful), or alternately may indicate a level of success (e.g., a first value for one cybersecurity breach, a second value for two cybersecurity breaches, etc.). The target data may be weighted based on the severity of the breach. For example, if a user with access to sensitive data was successfully phished, the target data value may be set to a higher value than if a user with no such access was successfully phished.

The historical cybersecurity attack data may include data associated with both real cybersecurity attacks as well as simulated cybersecurity attacks conducted for training purposes. Thus, some of the data may be taken from investigation of and/or reports on actual cybersecurity attacks conducted by malicious entities, whereas some of the data may be derived from cybersecurity training campaigns like those detailed below. Accordingly, as explained below, the data generated in simulated cybersecurity attacks may be used to improve a training data set, and thus to improve a model used to estimate failure rates.

The training data may further include detailed information about organizations specified in the historical cybersecurity attack data. Such organization-specific training data may include data indicating a size of the organization that was attacked, an industry of the organization, a cybersecurity score factor that may indicate an overall experience with cybersecurity issues for the organization (which may be derived as explained in detail below), and other such organization-specific data.

The organization-specific training data may further include information about particular individuals or groups of an organization. For example, individual member data may indicate, for various members of the organization, a role of the individual member (e.g., executive, IT support, legal, etc.), whether the individual member has access to sensitive data, a cybersecurity education level of the particular member (e.g., based on how much cybersecurity training was previously completed by the member), whether the member was previously compromised in a cybersecurity attack, etc.). Group data may further include a role of the group (e.g., an IT department, a legal department, etc.), a size of the group, whether the group has access to sensitive data, as well as one or more factors derived from the individual member data associated with various members of the group. For example, an average cybersecurity training level may be derived for the group by averaging the cybersecurity training level values of each of the group's members. Additionally or alternatively, a "weakest link" value for the group may indicate the lowest level of cybersecurity training among all of the members of the group. Accordingly, member-level data can be used to generate group-level data.

By the same token, member and/or group-level data may be used to generate additional organization-specific training data for the training data set. For example, an average cybersecurity training level for the organization may be derived by averaging the cybersecurity training level values of each of the organization's members, and/or the average cybersecurity training levels of each group of the organization. Thus, the cybersecurity training computing platform 110 may use stored data to generate or derive additional training data that may be retrieved at step 201 and used at step 202.

At step 202, the cybersecurity training computing platform 110 may use the data retrieved at step 201 to develop and/or train one or more model(s) for predicting failure rates. In some embodiments, the model(s) may be developed using machine learning techniques. Additionally or alternately, a linear regression model may be developed.

The cybersecurity training computing platform 110 may train machine learning model(s) using the input data retrieved at step 201. The input data, as discussed above, may include data specifying various organizations that were attacked in a plurality of historical cybersecurity attacks, organization-specific factors for each organization that was attacked, group-specific factors for various groups of the organizations that were attacked, individual-specific factors for various individuals of the organizations that were attacked, the type of each attack (e.g., phishing, trojan, etc.), and one or more particular attack templates that were used in each attack. The cybersecurity training computing platform 110 may use the target data that indicates whether (and/or to what extent) the particular attack was successful or not to train the model to output a predicted failure rate for an organization, group, and/or individual based on the various input factors.

In some cases, the cybersecurity training computing platform 110 may train multiple models to predict different failure rates. For example, a first model may be trained to predict a failure rate for an organization, a second model may be trained to predict a failure rate for a group within an organization, and a third model may be trained to predict a failure rate for an individual member of an organization. Each model may be trained using the same or similar input data, but different target data indicating historical successes and failures for organizations, groups, or individuals respectively. In other embodiments, a single model may be developed that can predict failure rates for entities of various sizes (e.g., a single model that can predict a failure rates for an organization, for a group, and/or for an individual).

The cybersecurity training computing platform 110 may alternately develop a linear regression model based on the data retrieved at step 201. The cybersecurity training computing platform 110 may determine, based on the data retrieved at step 201, an overall difficulty for each attack template. For example, based on the data retrieved at step 201 indicating that a particular attack template is successful a certain percentage of the time, a difficulty rating for that template may be calculated and assigned to the template. Similarly, the cybersecurity training computing platform 110 may calculate an industry-specific difficulty for each attack template based on how often a particular attack template was successful when used against organizations in a particular industry. Similarly, the cybersecurity training computing platform 110 may calculate a size-specific difficulty based on how often a particular attack template is successful when used against organizations of a particular size. Similarly, the cybersecurity training computing platform 110 may calculate a maturity-specific difficulty based on how often a particular attack template is successful when used against organizations having a particular set of cybersecurity scores (e.g., a score falling within a particular range). Based on these and other factors derived from the data retrieved at step 201, a linear regression model may be developed for estimating a predicted failure rate based on a particular attack template and organization-specific factors such as industry, size, and cybersecurity score.

At step 203, the cybersecurity training computing platform 110 may initiate a cybersecurity training campaign for a particular organization. The cybersecurity training computing platform 110 may initiate the cybersecurity training campaign in response to a user within the organization (e.g., an IT manager or cybersecurity manager) using an organization administrator user device 120 to initiate a cybersecurity training campaign. For example, the user of the organization administrator user device 120 may select an option (e.g., via a website provided by the cybersecurity training computing platform 110) to launch a cybersecurity training campaign after initiating a cybersecurity training service provided by the cybersecurity training computing platform 110. As illustrated in FIG. 3, the cybersecurity training computing platform 110 may provide an interactive user interface screen 300 (e.g., via a web page) to the organization administrator user device 120 that includes several selectable options for configuring a cybersecurity training campaign. Using a first option, the organization administrator user device 120 may access information about previous cybersecurity training provided by the cybersecurity training computing platform 110 to the organization (if any), such as lessons, videos, quizzes, etc. Using a second option, the organization administrator user device 120 may access the results of previous simulated cybersecurity attacks conducted by the cybersecurity training computing platform 110 for the organization (i.e., based on previous campaigns set up at the request of the organization administrator user device 120), if any. Using a third option, the organization administrator user device 120 may access an interface (not shown) for providing information about the organization, one or more groups of the organization, and/or one or more members of the organization, as described below at step 204, if such information was not already provided to the cybersecurity training computing platform 110, or may update any such information that was previously provided. A fourth option may be selected to begin the new cybersecurity training campaign after any organization data has been entered and/or updated.

At step 204, the cybersecurity training computing platform 110 may obtain information about the organization in order to generate one or more predicted failure rates. In some cases, the information may be provided by a member of the organization (e.g., the member that caused initiation of the cybersecurity training campaign at step 203, who may select a third option of user interface 300 to provide such information). Such information may include the organization-specific input data used as inputs for the model as discussed above, such as industry, size, cybersecurity score, member data (including role, access to sensitive data, cybersecurity education level, past attacks targeting the member, etc.), group data (e.g., data derived from member-specific data for members of the group, as well as group-specific data), and any other organization-specific data.

In some cases, in addition to or as an alternative to receiving organization data from the organization itself, the cybersecurity training computing platform 110 may obtain and/or derive organization, group, and member-specific data from public sources. Such sources may include the organization's website, social media accounts for members of the organization, government records, and other such publicly available information. In some cases, by using publicly available information instead of private information provided by the organization, the cybersecurity training computing platform 110 may provide a simulation of a cybersecurity attack based on information that would likely be obtained or used by malicious third parties.

Figure 2B:
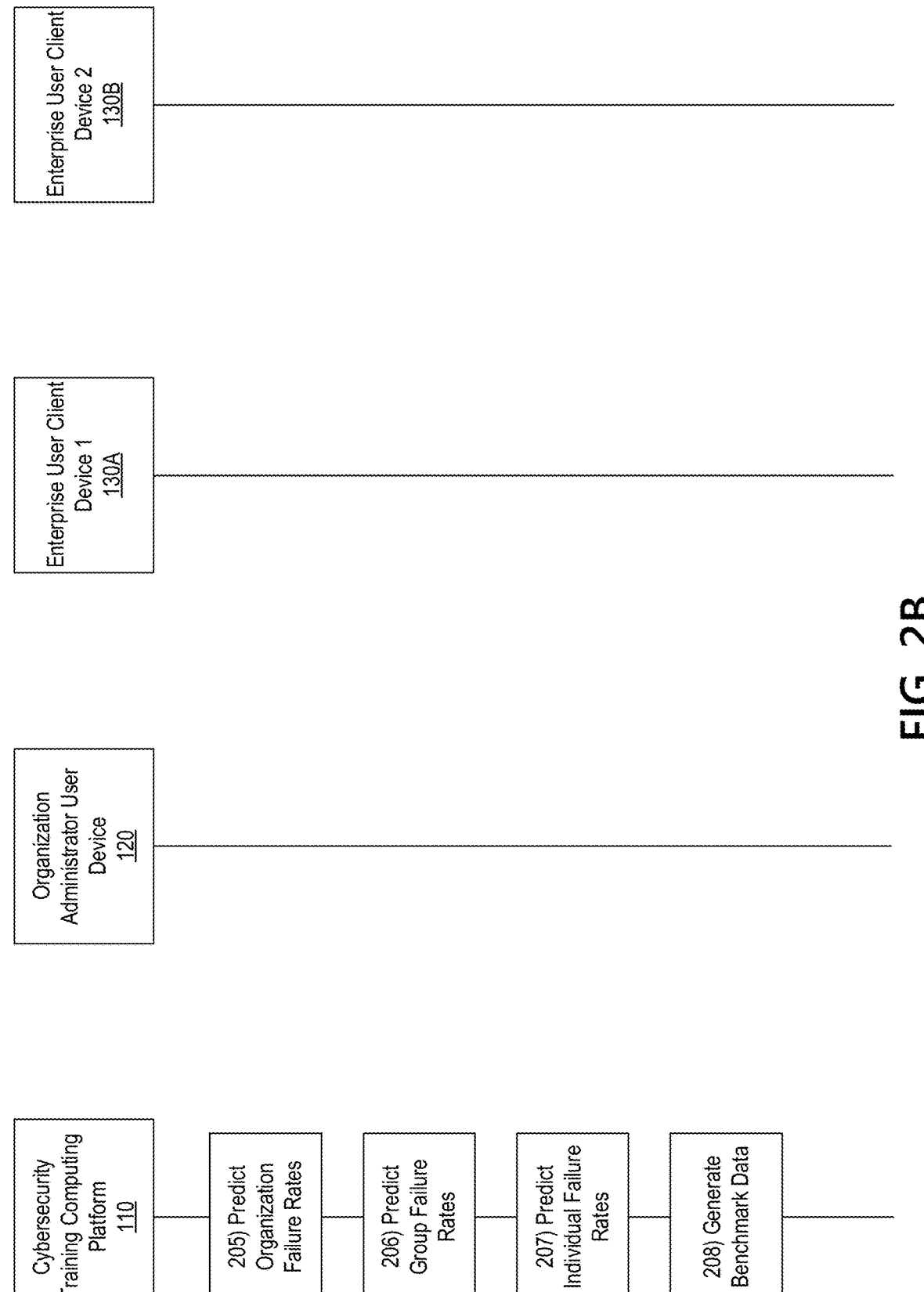
Figure 2C:
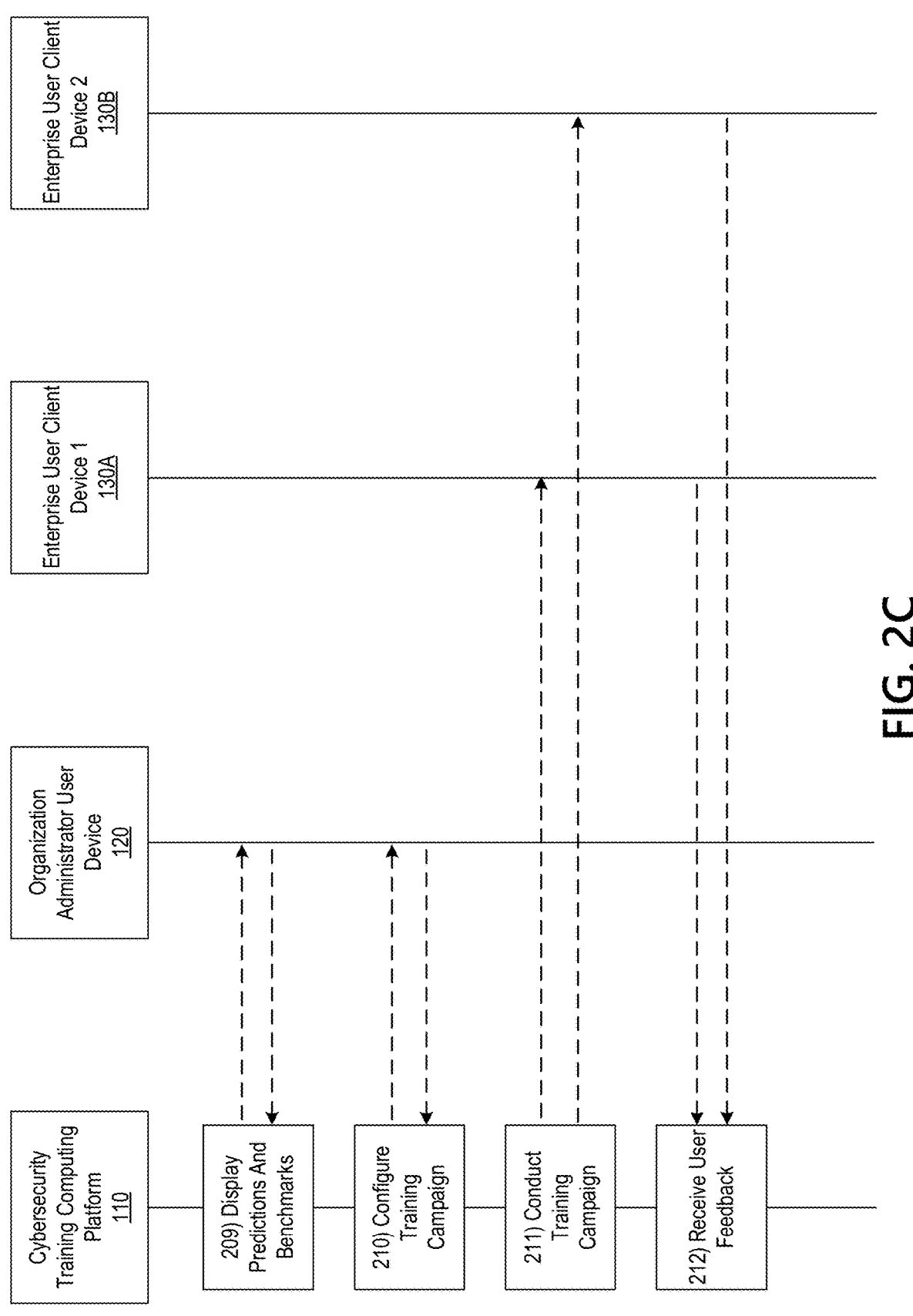

Turning to FIG. 2B, at step 205, the cybersecurity training computing platform 110 may use a model trained in step 202 to predict organization-level failure rates for a cybersecurity attack using one or more of the attack templates against the organization based on the organization-specific data received at step 204, and based on data specifying the attack template being used to attack the organization. In one example, the cybersecurity training computing platform 110 generates a failure rate for each template stored in the database 112c, and thus determines the attack template that is most likely to result in a cybersecurity breach. In some cases, the cybersecurity training computing platform 110 may generate a predicted failure rate for a cybersecurity attack using multiple templates. To generate the failure rates, the cybersecurity training computing platform 110 may need to process some or all of the organization-specific data received at step 204 into a form that can be used as input(s)

to the model generated at step 202. For example, such processing may involving normalizing data, converting values, or the like. Such processing may further involve generating organization-specific input data based on other data that is known about groups or members of the organization. For example, the cybersecurity training computing platform 110 may generate an average cybersecurity training level value for an organization based on cybersecurity training level values for multiple groups and/or individuals of the organization.

At step 206, the cybersecurity training computing platform 110 may use a model trained in step 202 to predict group-level failure rates for a cybersecurity attack using one or more of the attack templates against specific groups of the organization based on any group-level data received at step 204, and based on data specifying the template being used to attack the group. In one example, the cybersecurity training computing platform 110 generates, for each of multiple groups of the organization, a failure rate for each attack template stored in the database 112c, and thus determines the template that is most likely to result in a cybersecurity breach of each specific group. For example, a first attack template may be the most likely template to succeed against a first group of the organization (due to that template having a highest predicted failure rate for that group), whereas a second template may be the most likely template to succeed against a second group of the organization. In some cases, the cybersecurity training computing platform 110 may generate a predicted failure rate for a cybersecurity attack against a group that uses multiple templates. To generate the failure rates, the cybersecurity training computing platform 110 may need to process some or all of the group-level data received at step 204 into a form that can be used as input(s) to the model generated at step 202. For example, such processing may involving normalizing data, converting values, or the like. Such processing may further involve generating group-level input data based on other data that is known about members of the group. For example, the cybersecurity training computing platform 110 may generate an average cybersecurity training level value for the group based on cybersecurity training level values for multiple members of the group.

At step 207, the cybersecurity training computing platform 110 may use a model trained in step 202 to predict individual-level failure rates for a cybersecurity attack using one or more of the attack templates against specific individuals of the organization based on any individual-level data received at step 204, and based on data specifying the template being used to attack the individual. In one example, the cybersecurity training computing platform 110 generates, for each of multiple individuals of the organization, a failure rate for each template stored in the database 112c, and thus determines the template that is most likely to result in a cybersecurity breach of each specific individual. For example, a first template may be the most likely template to succeed against a first member of the organization (due to that template having a highest predicted failure rate for that member), whereas a second template may be the most likely template to succeed against a second member of the organization, etc. In some cases, the cybersecurity training computing platform 110 may generate a predicted failure rate for a cybersecurity attack against an individual that uses multiple templates. To generate the failure rates, the cybersecurity training computing platform 110 may need to process some or all of the individual-level data received at step 204 into a form that can be used as input(s) to the model generated at step 202. For example, such processing may involving normalizing data, converting values, or the like.

At step 208, the cybersecurity training computing platform 110 may generate benchmarking data by comparing the predicted failure rates generated at steps 205-207 to each other and to specific reference data providing benchmarks. For example, the organization-specific failure rates for each attack template (i.e., as generated at step 205) may be averaged to determine an average predicted failure rate, which may be compared to reference data specifying an average failure rate for all other organizations, for organizations in the same industry, for organizations of a similar size, etc. As another example, the highest predicted failure rate generated at step 205 may be compared to reference data specifying a highest predicted failure rate for all other organizations, for organizations in the same industry, for organizations of a similar size, etc.

Similarly, the cybersecurity training computing platform 110 may generate benchmarking data for groups by comparing group-level failure rates as generated at step 206 to the failure rates of other groups as generated at step 206, and/or to specific reference data providing benchmarks. For example, the cybersecurity training computing platform 110 may determine the group that is most likely to be compromised in a cybersecurity attack by averaging the group-specific failure rates for each group of the organization and comparing the averages, and/or by taking a highest predicted failure rate for each group and comparing them. These figures may be further compared to benchmarking data specifying an average failure rate for all reference groups, for reference groups of the same type or role, for reference groups of the same size, etc.

The cybersecurity training computing platform 110 may also generate benchmarking data for individuals by comparing individual-level failure rates as generated at step 207 to the failure rates of other individuals as generated at step 207, and/or to specific reference data providing benchmarks. For example, the cybersecurity training computing platform 110 may determine the member of the organization that is most likely to be compromised in a cybersecurity attack by averaging the member-specific failure rates for each member of the organization and comparing the averages, and/or by taking a highest predicted failure rate for each member and comparing them. These figures may be further compared to benchmarking data specifying an average failure rate for reference individuals, for reference individuals of the same role, for reference individuals with the same amount of cybersecurity training, etc.

At step 209, the cybersecurity training computing platform 110 may display the predicted failure rates and benchmarking data in one or more user interface screens provided to the organization administrator user device 120. The user interface may further provide selections and/or recommendations for configuring a simulated cybersecurity attack based on the predicted failure rates and benchmarking data. For example, as shown in FIG. 4, an example interface screen 400 may provide information about the predicted organization-level failure rates for several attack templates (in the illustrated example, "X" and "Y" templates). The attack templates may be ranked by failure rates and displayed in ranked order. In the illustrated example screen 400, the cybersecurity training computing platform 110 may only display attack templates with failure rates over a certain threshold. The cybersecurity training computing platform 110 may provide other screens (not shown) for accessing failure rate information for all attack templates. As shown in FIG. 4, the cybersecurity training computing platform 110 may provide, as part of interface 400, recommended selectable options based on the predicted failure rates. For example, the cybersecurity training computing platform 110 may generate a recommended selectable option for using the template with the highest predicted failure rate in a simulated cybersecurity attack. In some cases (not shown), the cybersecurity training computing platform 110 may generate a plurality of recommended selectable options for adding a plurality of templates to a simulated cybersecurity attack. For example, the cybersecurity training computing platform 110 may generate such recommended selectable options for every template with a score higher than a certain threshold (e.g., 5%).

Additionally, as shown in example interface 400, the cybersecurity training computing platform 110 may generate recommended selectable options to provide follow-up training for certain attack templates. The follow-up training may be provided in the form of videos or other materials tailored based on the template (e.g., training regarding avoiding providing passwords to third party websites if Y template specifies sending an email requesting that a user provide a password to a third party website). For example, the cybersecurity training computing platform 110 may generate such recommended selectable options for all templates that correspond to certain failure rate thresholds (e.g., lower than 5% and/or higher than 1%).

The example interface 400 may further include benchmark data providing comparisons to failure rates for other organizations. For example, the benchmark data may indicate that a predicted failure rate for X template of 5.1% is higher than average in comparison to all other organizations, organizations in the same industry, organizations of a similar size, and other such comparisons. Such information may assist the user of the organization administrator user device in deciding what type of training and simulated cybersecurity attacks to use in order to most effectively train the organization.

Figure 5:
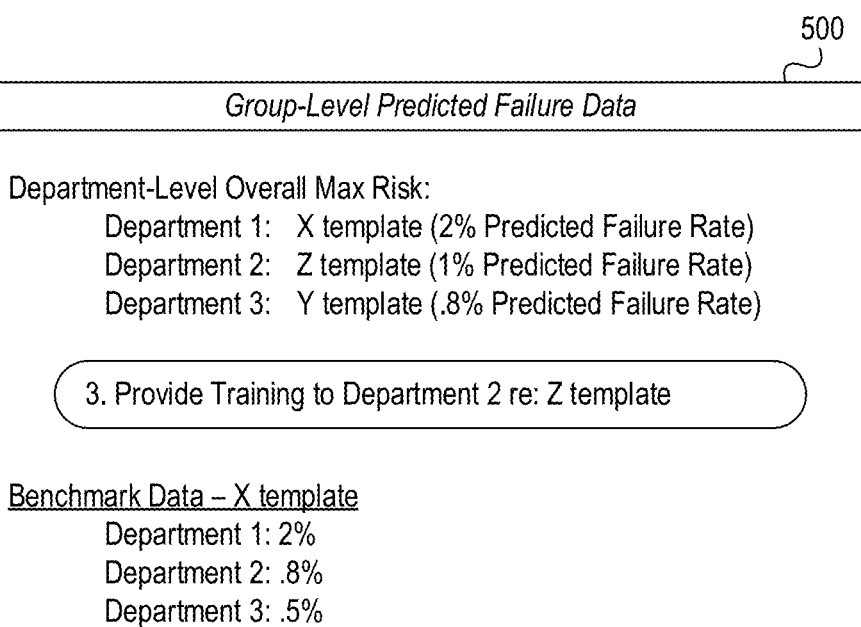

The cybersecurity training computing platform 110 may further provide group-specific data and recommended selectable options, as shown in example interface 500 of FIG. 5. For example, the cybersecurity training computing platform 110 may rank the departments by their highest predicted failure rate for any attack template, and display the ranked list as shown. Furthermore, the cybersecurity training computing platform 110 may provide recommended selectable options for providing group-specific training based on the highest predicted failure rate for each department, and based on recommended selectable options that were already selected for organization-level training. For example, as shown in interface 500, the cybersecurity training computing platform 110 may not display a recommended selectable option for training Department 1 based on X template or Department 3 based on Y template if X and Y template were already selected for organization-level training on example screen 400. However, cybersecurity training computing platform 110 may generate a recommended selectable option for training Department 2 using Z template because no organization-level training for Z template has yet been selected.

The cybersecurity training computing platform 110 may further generate benchmark data comparing different departments for a given attack template, for example. As shown in example interface 500, the cybersecurity training computing platform 110 may display each department's predicted failure rate for X template in ranked order. The cybersecurity training computing platform 110 may rank the departments based on failure rates for other templates as well (not shown), and may also provide benchmarks with regard to reference data (e.g., similar to the benchmark data shown in example interface 400).

Figure 6:
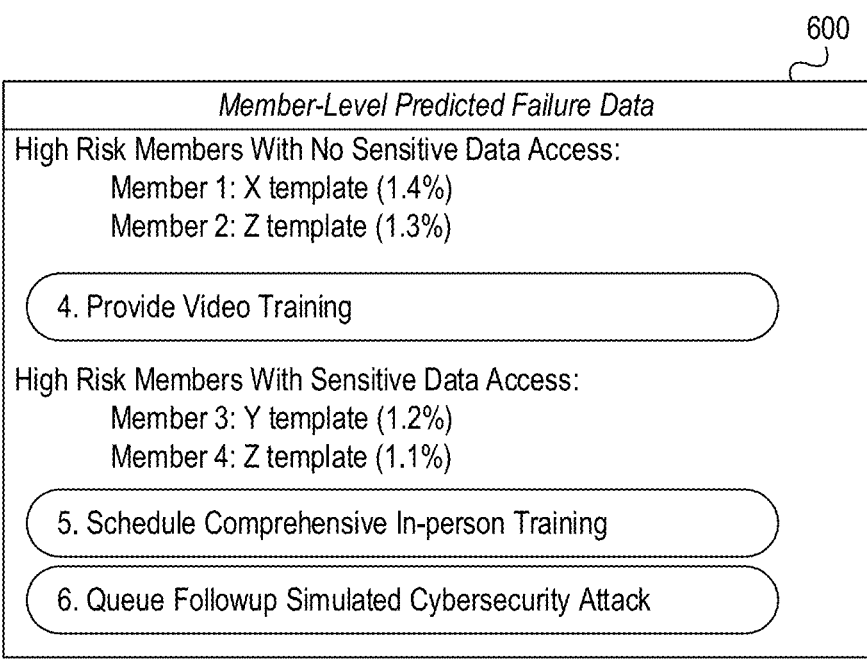

The cybersecurity training computing platform 110 may further provide member-specific data and recommended selectable options, as shown in example interface 600 of FIG. 6. For example, the cybersecurity training computing platform 110 may categorize members based on various factors (e.g., high risk members with and without sensitive data access), and display ranked listings by predicted failure rate for each category. Moreover, the cybersecurity training computing platform 110 may generate recommended selectable options for the various categories of members. For example, as shown, the cybersecurity training computing platform 110 may generate a recommended selectable option to provide video training to high risk members without sensitive data access, and may generate recommended selectable options to schedule more comprehensive in-person training for high risk members with sensitive data access, and may also queue follow-up simulated cybersecurity attacks to be conducted at a future time (e.g., after the comprehensive in-person training in the illustrated example).

Figure 7:
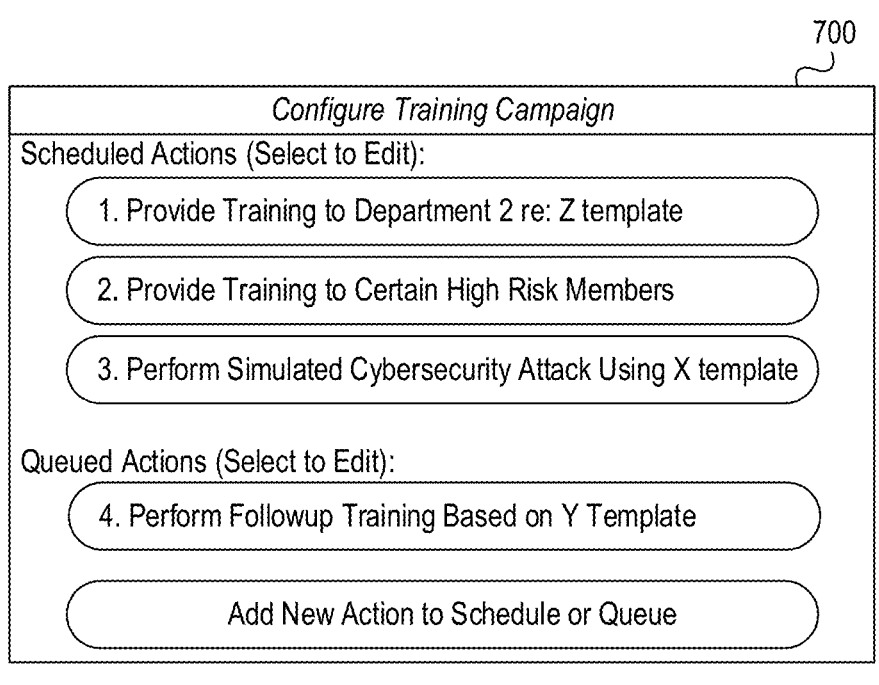
Figure 8:
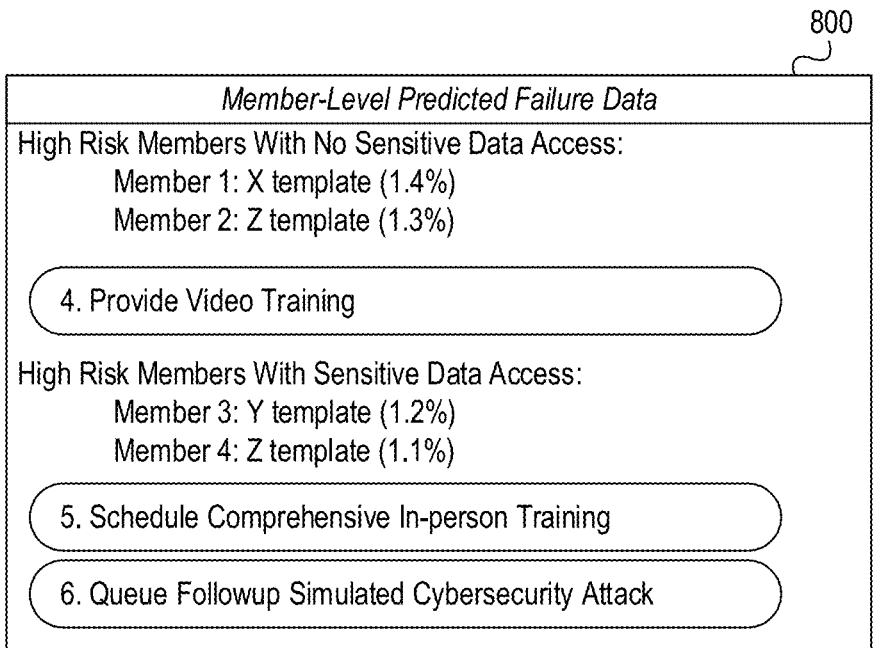

At step 210, the cybersecurity training computing platform 110 may allow the organization administrator user device to view and edit the configuration for the cybersecurity training campaign. The cybersecurity training computing platform 110 may display an interactive user interface, as shown in example interface 700 of FIG. 7. The interactive interface 700 may include several entries for actions to complete as part of the cybersecurity training campaign at a particular time and/or actions queued for later. Each action may be scheduled for a particular time that may be edited by a user of the organization administrator user device 120. The entries may be generated based on recommended selectable options (e.g., as shown in the interfaces of FIGS. 4-6) and/or other entries (e.g., a default entry included with every training campaign). The cybersecurity training computing platform 110 may create an order for the entries, for example by scheduling training actions prior to simulated cybersecurity attack actions, but this order may be editable by a user of the organization administrator user device 120. The cybersecurity training computing platform 110 may further provide an option to add other actions to a schedule or a queue in order to customize the training campaign. Such actions may include specific training or simulated cybersecurity attacks targeting the entire organization, specific groups of the organization, and/or specific members of the organization.

At step 211, the cybersecurity training computing platform 110 may conduct the training campaign according to the schedule as specified in step 210. The cybersecurity training computing platform 110 may provide training to enterprise user client device(s) 130, and may execute simulated cybersecurity attacks against enterprise user client device(s) 130. To provide the training, the cybersecurity training computing platform 110 may customize training modules for the organization and/or based on one or more templates that may be tested and/or that are associated with particular failure rates. For example, particular training sub-modules may be specific to certain types of attacks (e.g., phishing) and/or may be specific to certain attack templates (e.g., template X). The cybersecurity training computing platform 110 may generate a customized training module by selecting and arranging sub-modules as specified in the training campaign.

To execute simulated cybersecurity attacks, the cybersecurity training computing platform 110 may send a communication to an enterprise user client device 130 that is designed to test whether a user of the enterprise user client device 130 is likely to be compromised in a real cybersecurity attack. The form of the simulated cybersecurity attack (e.g., the text of a simulated phishing email) may be specified by the particular attack template. For example, a template providing a particular simulated phishing email may include text such as "Hi [user's name], updated account information is available at the following website: [testing URL]. Please enter your login credentials to access your information." A simulated phishing email for each user subject to the simulated attack may be generated from the template, and the cybersecurity training computing platform 110 may send the phishing email (e.g., from a spoofed or misleading email address). The cybersecurity training computing platform 110 may also host simulated malicious websites for securely testing whether a user will fail a simulated cyberattack test that includes a link to the simulated malicious website (e.g., by entering text into a form field of the simulated malicious website that requests the user's password). The cybersecurity training computing platform 110 may conduct the simulated cybersecurity attacks via email or other methods, including text messages, phone calls, and the like. The cybersecurity training computing platform 110 may execute one or more simulated attacks using various attack templates against the organization as a whole, against one or more groups of the organization, and/or against one or more individual members of the organization, as specified in the training campaign configuration (which may be generated by the cybersecurity training computing platform 110 and/or by a user of the AUCD 120, as discussed above).

At step 212, the cybersecurity training computing platform 110 may receive feedback from users in the form of reports that correctly identify the simulated cybersecurity attack as a cybersecurity attack and/or users that fail the simulated cybersecurity attack.

In some cases, enterprise user client devices 130 may be configured with a reporting function that, when selected by a user, automatically reports a suspicious communication. For example, a user's email client may have an embedded "report phish" button that the user has been trained to select whenever a suspicious email is received. If the enterprise user client device is configured with this functionality, the reporting function may be further configured to recognize a simulated cybersecurity attack (e.g., using a secret key embedded in a simulated phishing email), and automatically report to the cybersecurity training computing platform 110 when a user selects the reporting function for a simulated cybersecurity attack. Based on a user reporting the email, the cybersecurity training computing platform 110 may indicate that a particular user was adequately trained to recognize a particular cybersecurity attack.

In addition to or as an alternative to using an embedded reporting function as described above, users of the enterprise user client devices 130 may flag a simulated cybersecurity attack by forwarding it to or otherwise alerting IT support or some other member of the organization that is in charge of cybersecurity. The IT support or cybersecurity manager may then use the organization administrator user device 120 to indicate, to the cybersecurity training computing platform 110, that the user correctly recognized and reported the simulated cybersecurity attack, and the cybersecurity training computing platform 110 in turn may indicate that the particular user was adequately trained to recognize a particular cybersecurity attack.

User feedback may also take the form of users failing the test by providing password or other sensitive information in response to the simulated cybersecurity attack. For example, users may access a simulated malicious website as instructed by a simulated phishing email and enter text into a form requesting the user's password. As another example, users may respond to a simulated phishing email requesting that they reply with sensitive data by sending the requested sensitive data, or other sensitive data. The cybersecurity training computing platform 110 may log the failures as indications that a particular user, group, and/or organization would likely fail a real cybersecurity attack.

Additionally, in cases where a phishing email or text message is used to direct a user to a simulated malicious website, the cybersecurity training computing platform 110 may log a number of users who access the simulated malicious website.

Figure 2D:
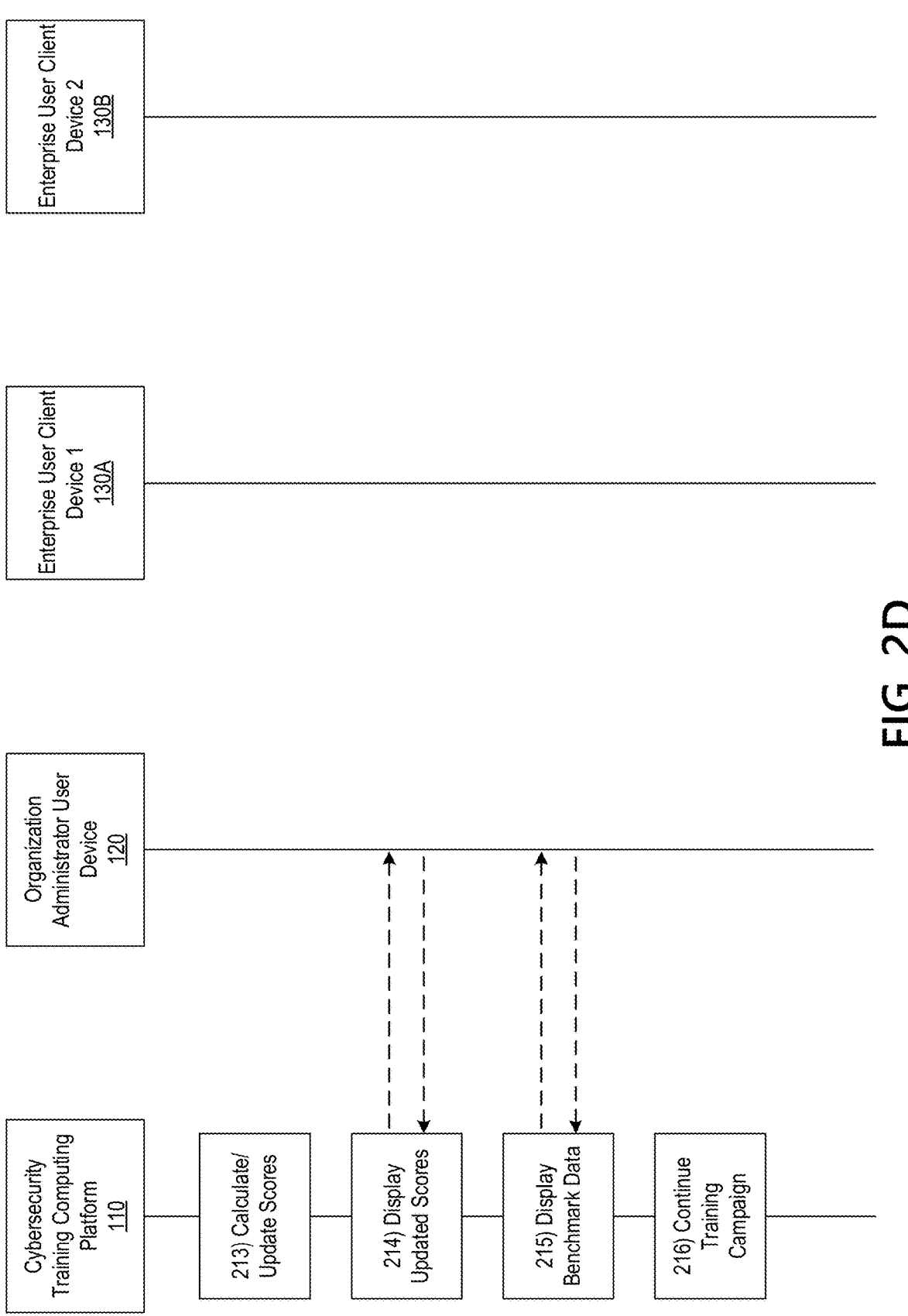

Turning to FIG. 2D, at step 213, the cybersecurity training computing platform 110 may calculate and/or update cybersecurity scores for the organization, for one or more groups of the organization, and/or for individual members of the organization based on the results of the training campaign, including the reports (i.e., by users that successfully recognized the cybersecurity attack) and the failures (i.e., by users that provided passwords and/or sensitive information in response to the simulated cybersecurity attacks).

The cybersecurity training computing platform 110 may initially provide a default cybersecurity score for each individual member. The cybersecurity training computing platform 110 may adjust the value (e.g., increase it by a small amount) whenever the user receives cybersecurity training. The adjustment due to cybersecurity training may be based on results of a quiz or test taken as part of the training, and in some case the user score may be adjusted downwards in response to the training (e.g., if the user does not complete the training, or if the user does poorly on a test or quiz). The cybersecurity training computing platform 110 may also adjust the cybersecurity score up (e.g., by a small amount) when the user does not fail the simulated cybersecurity attack, and may adjust the score up by a greater amount when the user reports the simulated cybersecurity attack. In some cases, the upwards adjustments may be proportional to a difficulty factor for the attack template used for the simulated cybersecurity attack. For example, if the template has a high average failure rate across different organizations, the cybersecurity training computing platform 110 may adjust a user cybersecurity score upwards by a relatively greater amount when the user does not fail and/or reports the simulated cybersecurity attack, but when the failure rate of a template is lower, the upwards adjustment may be relatively smaller. The cybersecurity training computing platform 110 may also adjust the cybersecurity score downward (e.g., by a large amount) if the user fails the simulated cybersecurity attack. In some cases, the downwards adjustment may be inversely proportional to the difficulty of the attack template used for the simulated cybersecurity attack.

The cybersecurity training computing platform 110 may also calculate and/or update cybersecurity scores for groups and/or organizations. The cybersecurity training computing platform 110 may provide a default value for each group and/or for the organization. The cybersecurity training computing platform 110 may adjust the value (e.g., increase it by a small amount) whenever the group and/or organization receives cybersecurity training. As above, the adjustment due to cybersecurity training may be based on results of a quiz or test taken as part of the training, and in some cases the score may be adjusted downwards in response to the training (e.g., if several users of the group or organization do not complete the training, or if the average score is low for a test or quiz). The cybersecurity training computing platform 110 may also adjust the cybersecurity score up when no users of the group of organization fail the simulated cybersecurity attack, and may adjust the score up by a greater amount when one or more users of the group or organization reports the simulated cybersecurity attack. In some cases, the cybersecurity training computing platform 110 adjusts the group and/or organization scores upwards based on a number of users of the group and/or organization that report the simulated cybersecurity attack. As above, the upwards adjustments may also be proportional to a difficulty factor for the template used for the simulated cybersecurity attack. The cybersecurity training computing platform 110 may also adjust the cybersecurity score downward (e.g., by a large amount) if any user of the group or organization fails the simulated cybersecurity attack. In some cases, the downwards adjustment may be inversely proportional to the difficulty of the attack template used for the simulated cybersecurity attack.

At step 214, the cybersecurity training computing platform may display the updated scores and initial results of the training campaign. For example, as shown at FIG. 9, the cybersecurity training computing platform 110 may generate an example interface 900 including a summary of the results, such as a number of users that succeeded and failed the simulated cybersecurity attack. In the example screen 900, scores for the entire organization are displayed, but other screens may be generated to display scores for groups and/or individual members. In the illustrated example, a score may have been adjusted upwards by +100 for the 3 reports of the simulated phishing attack, as described above at step 213. A smaller upward adjustment was included based on the large number of users who took no action in response to the simulated cybersecurity attack, as also described above at step 213. Finally, because one user accessed a simulated malicious website and entered text into a password form, a negative score adjustment calculated as described above at step 213 was applied. The organization score is then updated by summing the adjustments and adding them to the previous organization score. A similar process may be used to update group and member scores, as described at step 213.

The cybersecurity training computing platform 110 may further generate and display (e.g., in interface 900) recommended selectable options based on the results. For example, the cybersecurity training computing platform 110 may generate a recommended selectable option to schedule follow-up training for any department that includes a user who was compromised in the simulated cybersecurity attack. As shown in the illustrated example, the cybersecurity training computing platform 110 may also generate a recommended selectable option to provide more comprehensive (e.g., in-person) training to any user that was compromised in the simulated cybersecurity attack.

At step 215, the cybersecurity training computing platform 110 may generate and display benchmark data for the organization, the groups of the organization, and/or the members of the organization. For example, FIG. 10 illustrates example interface screen 1000, which the cybersecurity training computing platform may generate to compare the organization's cybersecurity score to the cybersecurity score averages for all organizations, for organizations in the same industry, for organizations of a similar size, and the like. Similar interface screens may be generated for group and individual benchmarks.

At step 216, the training campaign may be continued. The cybersecurity training computing platform 110 may continue by executing any follow-up training that is necessary or desired after the simulated malicious attacks (e.g., training selected via the example interface 900 at step 214). To deliver the follow-up training, the cybersecurity training computing platform 110 may select and/or tailor one or more training modules to correspond to specified template(s) and send the training modules to the user. Additionally or alternatively, the cybersecurity training computing platform 110 may continue the training campaign by executing any items that were queued for later (e.g., at steps 209 or 210).

In some cases, the cybersecurity training computing platform 110 may update the predicted failure rates for the organization, groups, and/or members to reflect the updated cybersecurity score that were updated in step 214. Thus, the cybersecurity training computing platform 110 may repeat steps 205-207 to generate new predicted failure rates, and then may further proceed to repeat step 208 to generate updated predicted failure rate benchmarks, repeat step 209 to display the updated predictions and failure rate benchmarks, repeat step 210 to further update and configure the training campaign, and repeat steps 211-215 to execute the updated training campaign, further update scores based on the updated training campaign, and display results. Thus, in many instances, the training campaign may be an iterative process that may repeat one or more times (e.g., until a user of the organization administrator user device 120 decides that satisfactory results have been achieved).

Figure 11:
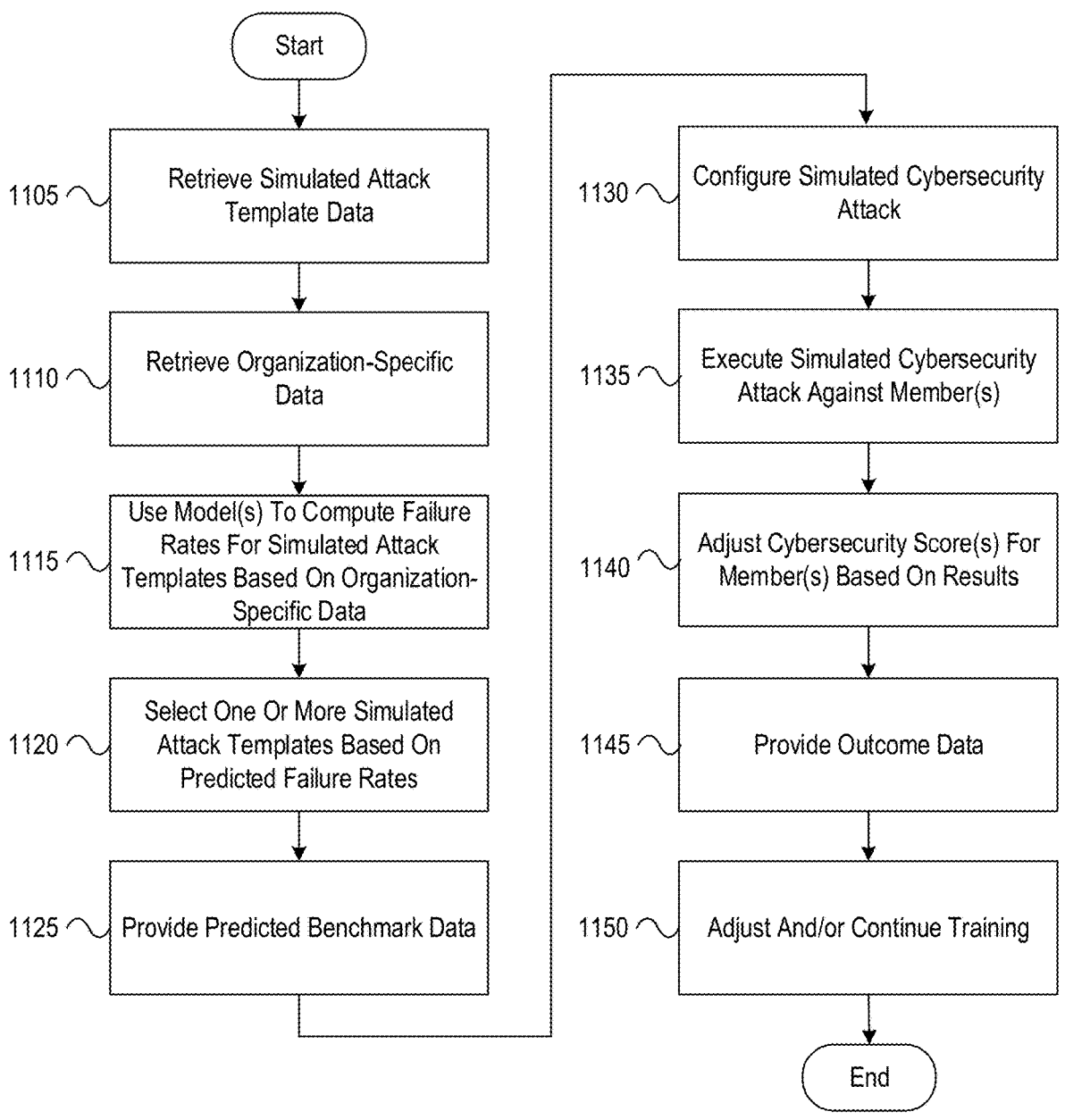
FIG. 11 depicts an illustrative method for providing training and information based on simulated cybersecurity attack difficulty in accordance with one or more example embodiments.

FIG. 11 depicts an illustrative method for providing training and information based on simulated cybersecurity attack difficulty. Referring to FIG. 11, at step 1105, a cybersecurity training computing platform having at least one processor, a communication interface, and memory may retrieve simulated attack template data (e.g., from memory). At step 1110, the cybersecurity training computing platform may retrieve organization-specific data about an organization that will undergo training (e.g., from memory and/or from the organization itself). At step 1115, the cybersecurity training computing platform may use one or more models to generate various predicted failure rates for the simulated attack templates based on the organization-specific data. At step 1120, the cybersecurity training computing platform may select one or more simulated attack templates (e.g., the template(s) with the highest predicted failure rate(s)). At step 1125, the cybersecurity training computing platform may provide benchmarks (e.g., against other organizations) based on one or more of the predicted failure rates for the organization. At step 1130, the cybersecurity training computing platform may configure a simulated cybersecurity attack using the templates selected at step 1120. At step 1135, the cybersecurity training computing platform may execute the simulated cybersecurity attack against one or more members of the organization. At step 1140, the cybersecurity training computing platform may adjust cybersecurity score(s) for the organization, for one or more groups within the organization, and/or for one or more members of the organization based on the results of the simulated cybersecurity attack. At step 1145, the cybersecurity training computing platform may provide outcome data for the simulated cybersecurity attack to the organization. At step 1150, as instructed by the organization, the cybersecurity training computing platform may adjust the training based on the results of the simulated cybersecurity attack and/or perform further training (e.g., provide additional simulated cybersecurity attacks, provide training modules to members, etc.).

The analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
using one or more machine learning models to compute a predicted failure rate for each attack template of a plurality of attack templates;
based on the predicted failure rates corresponding to the plurality of attack templates, generating a recommendation for one or more of the plurality of attack templates to configure a simulated cybersecurity attack on an organization; and
executing the simulated cybersecurity attack by contacting members of the organization according to the recommendation.

2. The method of claim 1, wherein executing the simulated cybersecurity attack comprises sending simulated phishing messages to the members of the organization.

3. The method of claim 1, further comprising:
generating the one or more machine learning models to compute the predicted failure rate based on a training data set that correlates organization-specific attributes to historical cybersecurity attack outcome data indicating whether historical cybersecurity attacks were successes or failures.

4. The method of claim 1, further comprising:
generating a linear regression model to compute a predicted failure rate for a respective template based on organization-specific attributes.

5. The method of claim 1, further comprising, prior to executing the simulated cybersecurity attack according to the recommendation:
customizing a training module based on information associated with the recommendation for one or more of the plurality of attack templates; and
providing the customized training module to the organization.

6. The method of claim 1, wherein the predicted failure rate for each attack template of the plurality of attack templates is based on organization-specific attributes.

7. The method of claim 6, wherein the organization-specific attributes include one or more of:
a size of the organization,
an industry in which the organization operates,
a cybersecurity score of the organization, or
member data indicating attributes of members of the organization.

8. The method of claim 7, wherein the member data indicates one or more of:
a role of each member of the organization,
whether each member of the organization has access to sensitive data,
a cybersecurity score of each member of the organization, or whether each member of the organization previously failed a cybersecurity attack.

9. The method of claim 8, further comprising:
updating a cybersecurity score for each member of the organization based on a response to the simulated cybersecurity attack.

10. The method of claim 9, wherein the updating comprises:
increasing the cybersecurity score in proportion to a difficulty factor associated with the one or more of the plurality of attack templates.

11. The method of claim 9, wherein the updating comprises:
increasing the cybersecurity score based on the member reporting the simulated cybersecurity attack.

12. The method of claim 1, further comprising:
generating a cybersecurity score for the organization;
generating one or more cybersecurity scores for one or more departments of the organization; and
generating one or more cybersecurity scores for one or more members of the organization.

13. The method of claim 1, further comprising:
executing a second simulated cybersecurity attack against a particular department of the organization by contacting members of the department using a communication specified in an attack template.

14. The method of claim 1, further comprising:
based on results of the simulated cybersecurity attack, scheduling follow-up training for one or more members of the organization;
customizing the follow-up training based on a type of template of the one or more of the plurality of attack templates; and
providing the customized follow-up training to the one or more members.

15. The method of claim 1, further comprising:
generating a comparison of a simulated attack performance of the organization to performances of other organizations in a same industry as the organization; and
sending the comparison to an administrator user device associated with the organization.

16. The method of claim 1, wherein the one or more machine learning models are trained using training data derived from real cyber attacks and derived from simulated cyber attacks used for training purposes.

17. A cybersecurity training computing platform comprising:
at least one processor;
a communication interface; and
memory storing instructions that, when executed by the at least one processor, cause the cybersecurity training computing platform to:
use one or more machine learning models to compute a predicted failure rate for each attack template of a plurality of attack templates;
based on the predicted failure rates corresponding to the plurality of attack templates, generate a recommendation for one or more of the plurality of attack templates to configure a simulated cybersecurity attack on an organization; and
execute the simulated cybersecurity attack by contacting members of the organization according to the recommendation.

18. The cybersecurity training computing platform of claim 17, wherein executing the simulated cybersecurity attack comprises sending simulated phishing messages to the members of the organization.

19. One or more non-transitory computer-readable media comprising instructions that, when executed, cause a computing platform to:

use one or more machine learning models to compute a predicted failure rate for each attack template of a plurality of attack templates;

based on the predicted failure rates corresponding to the plurality of attack templates, generate a recommendation for one or more of the plurality of attack templates to configure a simulated cybersecurity attack on an organization; and execute the simulated cybersecurity attack by contacting members of the organization according to the recommendation.

20. The one or more non-transitory computer-readable media of claim 19, wherein executing the simulated cybersecurity attack comprises sending simulated phishing messages to the members of the organization.

\* \* \* \* \*